US012399310B2

(12) United States Patent
Ockenfuss

(10) Patent No.: US 12,399,310 B2
(45) Date of Patent: Aug. 26, 2025

(54) OPTICAL INTERFERENCE FILTER

(71) Applicant: VIAVI Solutions Inc., Chandler, AZ (US)

(72) Inventor: Georg J. Ockenfuss, Santa Rosa, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 209 days.

(21) Appl. No.: 18/063,930

(22) Filed: Dec. 9, 2022

(65) Prior Publication Data

US 2023/0194762 A1 Jun. 22, 2023

Related U.S. Application Data

(60) Provisional application No. 63/265,566, filed on Dec. 16, 2021.

(51) Int. Cl.
G02B 5/28 (2006.01)

(52) U.S. Cl.
CPC .................... G02B 5/288 (2013.01)

(58) Field of Classification Search
CPC ........ G02B 5/288; G02B 5/285; G02B 1/115; G02B 5/20; G02B 1/007; C23C 28/42
See application file for complete search history.

(56) References Cited

U.S. PATENT DOCUMENTS

| 9,568,362 | B2 | 2/2017 | Ockenfuss | |
| 9,588,269 | B2* | 3/2017 | Hendrix | G02B 5/285 |
| 2013/0040119 | A1* | 2/2013 | Chen | C23C 28/042 |
| | | | | 204/192.15 |
| 2013/0120842 | A1* | 5/2013 | Moens | C03C 17/36 |
| | | | | 359/585 |
| 2020/0209448 | A1* | 7/2020 | Rowlands | C23C 28/42 |
| 2020/0408976 | A1 | 12/2020 | Kim et al. | |

FOREIGN PATENT DOCUMENTS

| CN | 210954392 U | 7/2020 |
| EP | 3588027 A2 | 1/2020 |

OTHER PUBLICATIONS

Demichelis F., et al., "Optical Properties of Hydrogenated Amorphous Silicon," Journal of Applied Physics, Jan. 1986, vol. 59(2), pp. 611-618, XP055643758.
Extended European Search Report for Application No. EP22214370.3, mailed on May 11, 2023, 10 pages.

* cited by examiner

Primary Examiner — Jonathan Y Jung
(74) Attorney, Agent, or Firm — Harrity & Harrity, LLP

(57) ABSTRACT

An optical interference filter includes a substrate and a plurality of sets of layers that are disposed over the substrate. Each set of layers includes: a first layer that comprises at least a first oxide; a second layer disposed over the first layer that comprises at least a second oxide; and a third layer disposed over the second layer that comprises at least hydrogen and silicon. The optical interference filter may be configured to transmit light associated with a first spectral range (e.g., from 585 nanometers to 700 nanometers) and to block light associated with a second spectral range (e.g., from 440 nanometers to 475 nanometers). The third layer may have an extinction coefficient for the second spectral range that is greater than four times an extinction coefficient of the third layer for the first spectral range.

20 Claims, 13 Drawing Sheets

| Layer # | Material | thickness [nm] |
|---|---|---|
| | substrate | |
| 1 | Ta2O5 | 47.69 |
| 2 | SiO2 | 38.27 |
| 3 | SiH | 13.26 |
| 4 | SiO2 | 5.00 |
| 5 | Ta2O5 | 176.43 |
| 6 | SiO2 | 5.00 |
| 7 | SiH | 21.78 |
| 8 | SiO2 | 5.00 |
| 9 | Ta2O5 | 160.27 |
| 10 | SiO2 | 5.00 |
| 11 | SiH | 24.83 |
| 12 | SiO2 | 5.00 |
| 13 | Ta2O5 | 155.61 |
| 14 | SiO2 | 5.00 |
| 15 | SiH | 27.26 |
| 16 | SiO2 | 5.00 |
| 17 | Ta2O5 | 138.49 |
| 18 | SiO2 | 5.00 |
| 19 | SiH | 45.56 |
| 20 | SiO2 | 5.00 |
| 21 | Ta2O5 | 156.08 |
| 22 | SiO2 | 5.00 |
| 23 | SiH | 18.48 |
| 24 | SiO2 | 5.00 |
| 25 | Ta2O5 | 168.45 |
| 26 | SiO2 | 5.00 |
| 27 | SiH | 29.74 |
| 28 | SiO2 | 5.00 |
| 29 | Ta2O5 | 142.07 |
| 30 | SiO2 | 5.00 |
| 31 | SiH | 38.57 |
| 32 | SiO2 | 5.00 |
| 33 | Ta2O5 | 159.40 |
| 34 | SiO2 | 5.00 |
| 35 | SiH | 16.79 |
| 36 | SiO2 | 5.00 |
| 37 | Ta2O5 | 178.10 |
| 38 | SiO2 | 5.00 |
| 39 | SiH | 12.15 |
| 40 | SiO2 | 5.00 |
| 41 | Ta2O5 | 93.31 |
| 42 | SiO2 | 74.74 |
| 43 | Ta2O5 | 63.31 |
| 44 | SiO2 | 20.00 |
| 45 | Ta2O5 | 67.10 |
| 46 | SiO2 | 132.75 |
| air | | |

| Layer # | Material | thickness [mm] |
|---|---|---|
| | substrate | |
| 1 | NbTiOx | 59.67 |
| 2 | SiO2 | 5.15 |
| 3 | SiH | 59.92 |
| 4 | SiO2 | 5.15 |
| 5 | NbTiOx | 125.14 |
| 6 | SiO2 | 5.15 |
| 7 | SiH | 29.24 |
| 8 | SiO2 | 5.15 |
| 9 | NbTiOx | 134.72 |
| 10 | SiO2 | 5.15 |
| 11 | SiH | 29.59 |
| 12 | SiO2 | 5.15 |
| 13 | NbTiOx | 139.36 |
| 14 | SiO2 | 5.15 |
| 15 | SiH | 23.97 |
| 16 | SiO2 | 5.15 |
| 17 | NbTiOx | 138.63 |
| 18 | SiO2 | 5.15 |
| 19 | SiH | 30.94 |
| 20 | SiO2 | 5.15 |
| 21 | NbTiOx | 122.55 |
| 22 | SiO2 | 5.15 |
| 23 | SiH | 33.80 |
| 24 | SiO2 | 5.15 |
| 25 | NbTiOx | 138.57 |
| 26 | SiO2 | 5.15 |
| 27 | SiH | 18.92 |
| 28 | SiO2 | 75.11 |
| 29 | NbTiOx | 39.22 |
| 30 | SiO2 | 100.17 |
| 31 | NbTiOx | 51.87 |
| 32 | SiO2 | 73.42 |
| 33 | NbTiOx | 50.42 |
| 34 | SiO2 | 84.67 |
| 35 | NbTiO5 | 52.21 |
| 36 | SiO2 | 83.45 |
| 37 | NbTiOx | 51.64 |
| 38 | SiO2 | 79.61 |
| 39 | NbTiOx | 50.81 |
| 40 | SiO2 | 38.78 |
| 41 | NbTiOx | 409.71 |
| 42 | SiO2 | 23.88 |
| 43 | NbTiOx | 54.91 |
| 44 | SiO2 | 71.35 |
| 45 | NbTiOx | 174.60 |
| 46 | SiO2 | 91.90 |
| 47 | NbTiOx | 178.10 |
| 48 | SiO2 | 58.84 |
| 49 | NbTiOx | 77.98 |
| 50 | SiO2 | 33.41 |
| 51 | NbTiOx | 197.67 |
| 52 | SiO2 | 69.08 |
| 53 | NbTiOx | 161.42 |
| 54 | SiO2 | 162.52 |
| | air | |

Layers 1–4: 410; 5–8: 410; 9–12: 410; 13–16: 410; 17–20: 410; 21–24: 410; 25–28: 410; 29–30: 420; 31–32: 420; 33–34: 420; 35–36: 420; 37–38: 420; 39–40: 420; 41–42: 420; 43–44: 420; 45–46: 420; 47–48: 420; 49–50: 420; 51–52: 420; 53–54: 420

FIG. 4D

OPTICAL INTERFERENCE FILTER

RELATED APPLICATION

This application claims priority to U.S. Provisional Patent Application No. 63/265,566, entitled "OPTICAL FILTER," filed on Dec. 16, 2021, the content of which is incorporated by reference herein in its entirety.

BACKGROUND

An optical device may be utilized to capture information concerning light. For example, the optical device may capture information relating to a set of wavelengths associated with the light. The optical device may include a set of sensor elements (e.g., optical sensors, spectral sensors, and/or image sensors) that capture the information. For example, an array of sensor elements may be utilized to capture information relating to multiple wavelengths. The array of sensor elements may be associated with an optical filter. The optical filter may include a passband associated with a first wavelength range of light that is passed to the array of sensor elements. The optical filter may be associated with blocking a second wavelength range of light from being passed to the array of sensor elements.

SUMMARY

In some implementations, an optical interference filter includes a substrate; and a plurality of sets of layers that are disposed over the substrate, wherein each set of layers includes: a first layer that comprises at least tantalum and oxygen or at least niobium, titanium, and oxygen; a second layer disposed over the first layer that comprises at least silicon and oxygen; a third layer disposed over the second layer that comprises at least hydrogen and silicon; and a fourth layer disposed over the third layer that comprises at least silicon and oxygen, wherein: the optical interference filter is configured to transmit light associated with a first spectral range and to block light associated with a second spectral range, and the third layer has an extinction coefficient for the second spectral range that is greater than or equal to four times an extinction coefficient of the third layer for the first spectral range.

In some implementations, an optical interference filter includes a substrate; and a plurality of sets of layers that are disposed over the substrate, wherein each set of layers includes: a first layer that comprises at least a first oxide; a second layer disposed over the first layer that comprises at least a second oxide; and a third layer disposed over the second layer that comprises at least hydrogen and silicon, wherein: the optical interference filter is configured to transmit light associated with a first spectral range and to block light associated with a second spectral range, and the third layer has an extinction coefficient for the second spectral range that is greater than or equal to four times an extinction coefficient of the third layer for the first spectral range.

In some implementations, an optical interference filter includes a substrate; and a plurality of sets of layers that are disposed over the substrate, wherein each set of layers includes: a first layer that comprises at least a first oxide; a second layer disposed over the first layer that comprises at least a second oxide; a third layer disposed over the second layer, wherein: the optical interference filter is configured to transmit light associated with a first spectral range and to block light associated with a second spectral range, and the third layer has an extinction coefficient for the second spectral range that is greater than or equal to four times an extinction coefficient of the third layer for the first spectral range.

BRIEF DESCRIPTION OF THE DRAWINGS

FIGS. 3A-3D are diagrams related to an example configuration of the optical filter described herein.

FIGS. 4A-4D are diagrams related to an example configuration of the optical filter described herein.

DETAILED DESCRIPTION

Figure 1:
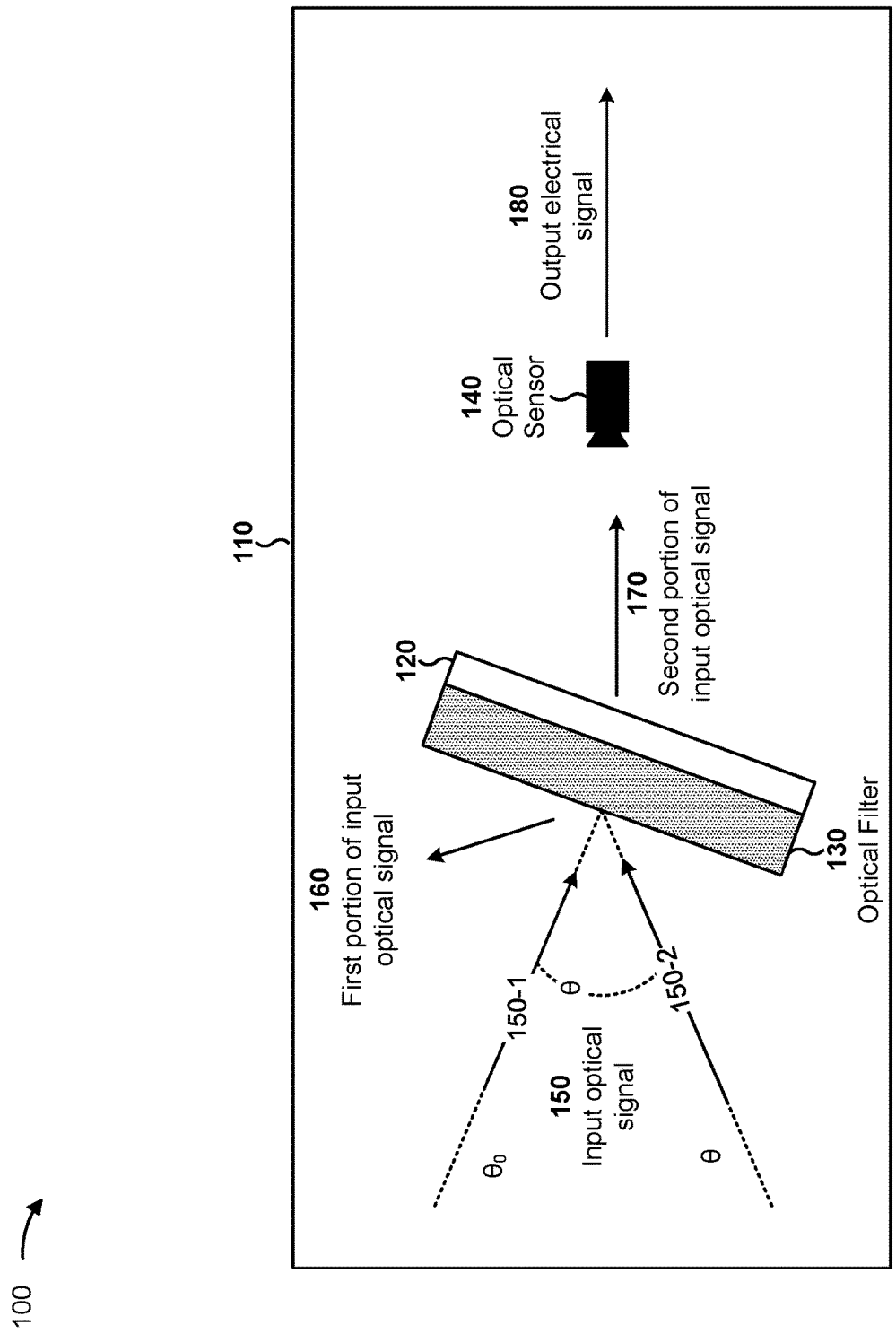
FIG. 1 is a diagram of an overview of an example implementation described herein.

The following detailed description of example implementations refers to the accompanying drawings. The same reference numbers in different drawings may identify the same or similar elements. The following description uses a spectrometer as an example. However, the techniques, principles, procedures, and methods described herein may be used with any sensor, including but not limited to other optical sensors and spectral sensors.

Optical filters are used in spectroscopic applications to selectively pass a wavelength or a band of wavelengths of light emitted by a sample, and/or to selectively block a wavelength or a band of wavelengths of light illuminating the sample. For example, in a fluorescence spectroscopic application, a beam of excitation light illuminates a sample, and light at a longer wavelength is detected to obtain its optical spectrum and/or to determine a total level of fluorescence emitted by the sample in response to excitation by the excitation light.

In some cases, an optical filter includes multiple components to both block excitation light and pass light emitted by a sample. For example, the optical filter can include a dark mirror to absorb a first band of wavelengths of light (e.g., to absorb scattered light that is reflected by one or more other components of the optical filter), an induced transmission filter (ITF) to block a second band of wavelengths of light, and a longwave pass (LWP) filter (e.g., a dielectric LWP) to pass a third band of wavelength. This therefore requires multiple coating steps, vacuum processing steps, wafer level processing (WLP) steps, assembly steps, or other steps (e.g., that require different temperatures and/or processing environments) to produce the individual components of the optical filter, which increases a complexity (and cost) of an associated spectroscopic device that includes the optical filter.

Moreover, a performance of the optical filter may be degraded when an angle of incidence (AOI) of light (e.g., emitted by the sample) directed toward the optical filter changes from a configured incidence (e.g., 0 degrees (normal), 30 degrees, 45 degrees, and/or the like) by at least a threshold amount (e.g., greater than or equal to 20 degrees deviation from the configured incidence, 40 degrees deviation from the configured incidence, and/or 60 degrees deviation from the configured incidence). For example, the optical filter may shift toward lower wavelengths at an increase in an AOI. In this way, the optical filter may pass unwanted or undesired light (e.g., one or more portions of the excitation light and other light not emitted by the sample), which may affect a sensing accuracy of an optical sensor of the spectroscopic device that receives the passed light.

Some implementations described herein provide an optical filter (e.g., an optical interference filter) that includes a single coating. The coating may include sets of layers, wherein each set of layers includes a first layer that comprises at least a first oxide (e.g., at least tantalum and oxygen or at least niobium, titanium, and oxygen); a second layer disposed over the first layer that comprises at least a second oxide (e.g., at least silicon and oxygen); and a third layer disposed over the second layer that comprises at least another material (e.g., at least hydrogen and silicon). In some implementations, each set of layer may also include a fourth layer disposed over the third layer that comprises at least the second oxide (e.g., at least silicon and oxygen). Accordingly, the optical filter blocks and/or attenuates light associated with an excitation wavelength band, such as from 440 nm to 475 nm (e.g., greater than or equal to 440 nm and less than or equal to 475 nm), and the optical filter passes and/or transmits light associated with an emission wavelength band, such as from 585 nm to 700 nm (e.g., greater than or equal to 580 nm and less than or equal to 700 nm). In other words, in some implementations, the optical filter provides blocking or attenuation of excitation light that includes portions of blue light and/or green light and passes or provides transmission of emission light (e.g., associated with fluorophore molecules emitted by a subject) that includes portions of red light and/or near infrared (NIR) light.

In this way, some implementations described herein provide an optical filter that does not need additional components to both block excitation light and pass light emitted by a sample. Therefore, a number of processing steps needed to produce the optical filter is less than that needed to produce a typical multi-component optical filter. This thereby decreases a complexity (and cost) of an associated spectroscopic device that includes the optical filter (e.g., as compared to a spectroscopic device that includes the typical optical filter and the additional components).

Additionally, or. In this way, the low angle shift optical filter reduces an amount of shift toward lower wavelengths (e.g., for incidence light at increasing angles of incidence). This therefore reduces an amount of unwanted or undesired light that is passed by the low angle shift optical filter, which improves a sensing accuracy of an optical sensor that receives light that is passed by the low angle shift optical filter.

FIG. 1 is a diagram of an overview of an example implementation 100 described herein. As shown in FIG. 1, example implementation 100 includes a sensor system 110 (e.g., a fluorescence detection system). Sensor system 110 may be a portion of an optical system and may provide an electrical output corresponding to a sensor determination. Sensor system 110 includes an optical filter structure 120, which includes an optical filter 130, and an optical sensor 140. For example, optical filter structure 120 may include an optical filter 130 that performs a blocking functionality and a passband filtering functionality. In another example, an optical filter 130 may be aligned to an array of sensor elements of optical sensor 140.

Although some implementations described herein may be described in terms of an optical filter in a sensor system, implementations described herein may be used in another type of system, may be used external to a sensor system, or in other configurations.

As further shown in FIG. 1, and by reference number 150, an input optical signal is directed toward optical filter structure 120 at one or more angles of incidence, θ. For example, input optical signals 150-1 and 150-2 may be directed toward optical filter structure 120 at angles of incidence $θ_0$ (e.g., a configured angle of incidence) and θ, respectively. The input optical signal may include, but is not limited to, light associated with a particular spectral range (e.g., a spectral range of 585 nm to 700 nm, or another spectral range). The input optical signal may include, for example, light (e.g., emission light) that is emitted by a sample (e.g., a biological sample) that is illuminated by other light (e.g., excitation light) that is associated with a different spectral range (e.g., a spectral range of 440 nm to 475 nm, or another spectral range). The light may propagate to the optical sensor 140 to permit optical sensor 140 to perform a measurement of the light. In another example, the optical sensor 140 may perform another functionality, such as a testing functionality, a sensing functionality, or a communications functionality, among other examples.

As further shown in FIG. 1, and by reference number 160, a first portion of the input optical signal with a first spectral range is not passed through by optical filter 130 and optical filter structure 120. For example, dielectric filter stacks of dielectric thin film layers, which may include high index material layers and low index material layers of optical filter 130, may cause the first portion of light to be reflected (e.g., in a first direction), absorbed, and/or otherwise blocked. In this case, the first portion of light may be a threshold portion of light incident on optical filter 130 not included in a bandpass of optical filter 130. As shown by reference number 170, a second portion of the input optical signal is passed through by optical filter 130 and optical filter structure 120. For example, optical filter 130 may pass through the second portion of light with a second spectral range (e.g., in a second direction) toward optical sensor 140. In this case, the second portion of light may be a threshold portion of light incident on optical filter 130 within a bandpass of optical filter 130, such as greater than or equal to 10% of incident light in a spectral range of 585 nm to 700 nm. The second portion of light may pass through the optical filter 130 with less than a threshold angle shift, as described in more detail herein.

As further shown in FIG. 1, based on the second portion of the input optical signal being passed to optical sensor 140, optical sensor 140 may provide an output electrical signal 180 for sensor system 110, such as for use in fluoroscopy, imaging, ambient light sensing, detecting the presence of an object, performing a measurement, or facilitating communication, among other examples. In some implementations, another arrangement of optical filter 130 and optical sensor 140 may be utilized. For example, rather than passing the second portion of the optical signal collinearly with the input optical signal, optical filter 130 may direct the second portion of the optical signal in another direction toward a differently located optical sensor 140.

As indicated above, FIG. 1 is provided as an example. Other examples may differ from what is described with regard to FIG. 1.

Figure 2A:
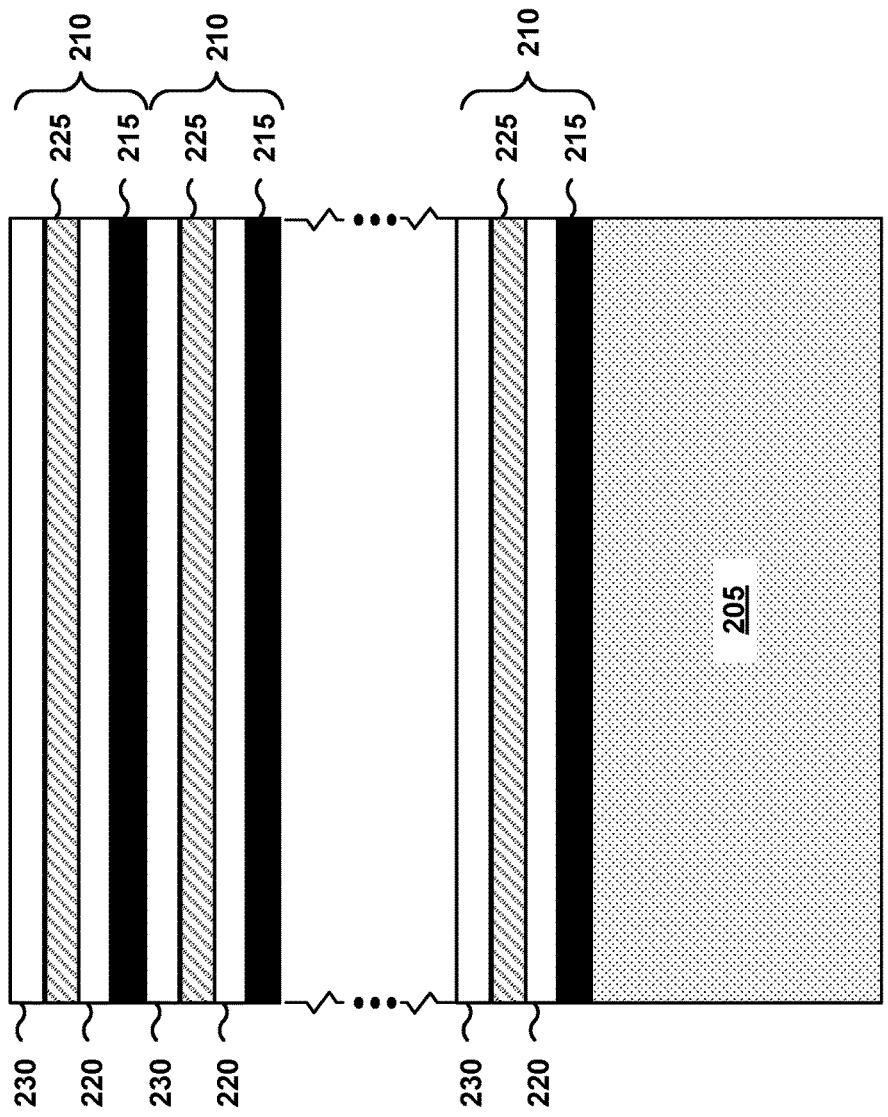
FIGS. 2A-2B are diagrams of an example optical filter.
Figure 2B:
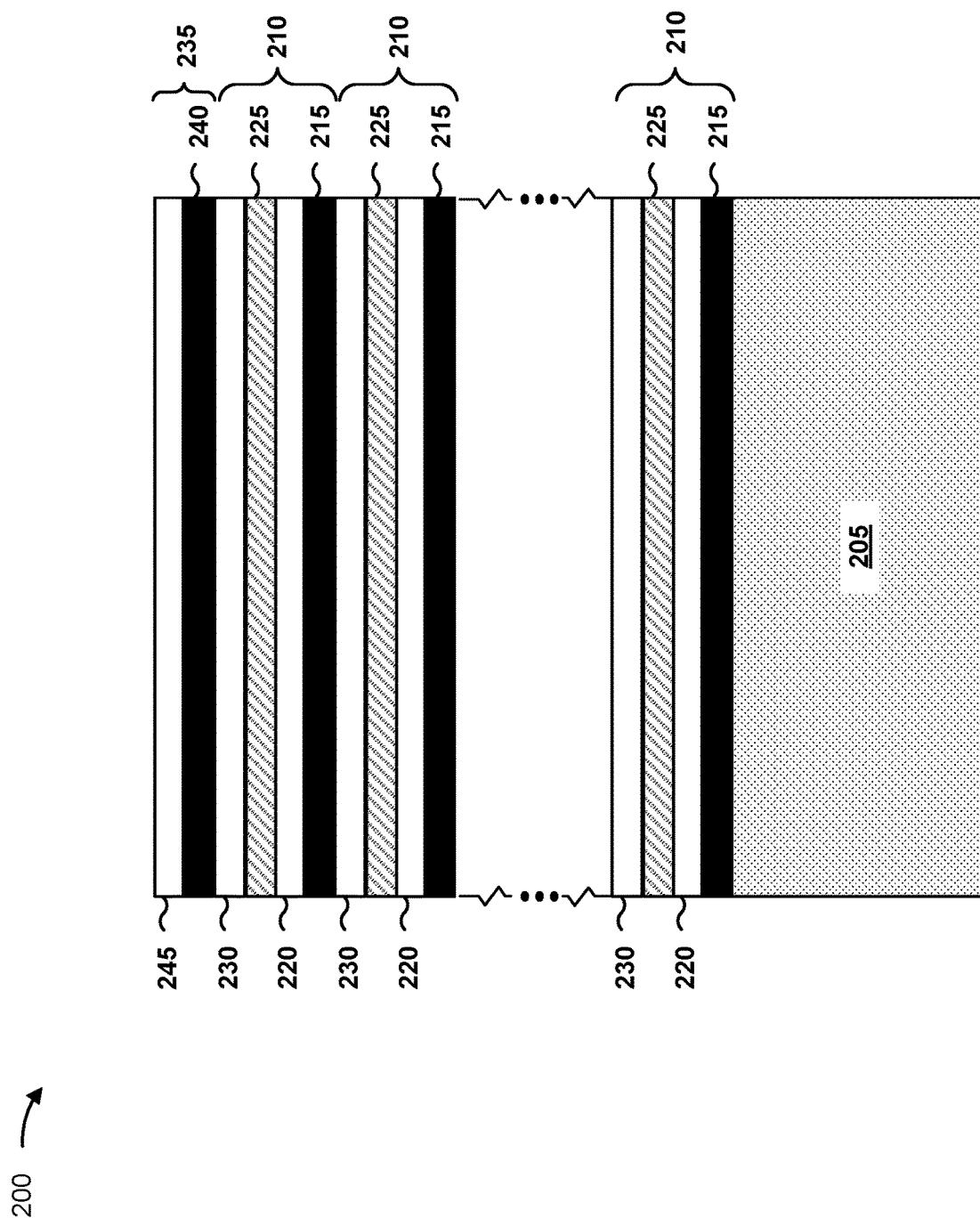

FIGS. 2A-2B are diagrams of an example optical filter 200. In some implementations, the optical filter 200 may be an optical interference filter and/or may comprise at least one of a spectral filter, a multispectral filter, a bandpass filter, a blocking filter, a long-wave pass filter, a dichroic filter, a linear variable filter, a circular variable filter, a Fabry-Perot filter, an absorbent filter, among other examples. FIGS. 2A-2B show respective example stack ups of the optical filter 200.

As shown in FIG. 2A, the optical filter 200 may include a substrate 205 and one or more sets of layers 210 (e.g., one or more sets of optical filter layers). The substrate 205 may comprise a glass substrate, a polymer substrate, a polycarbonate substrate, a silicon (Si) substrate, a germanium (Ge) substrate, or an active device wafer (e.g., that comprises a photodiode (PD), a PD array, an avalanche photodiode (APD), an APD array, a charge-coupled device (CCD) sensor, and/or a complementary metal oxide semiconductor (CMOS) sensor, among other examples). In some implementations, a thickness of the substrate 205 may be greater than or equal to 20 microns (μm), 50 μm, and/or 500 μm. Additionally, or alternatively, the thickness of the substrate 205 may be less than or equal to a particular thickness threshold. The particular thickness threshold, for example, may be less than or equal to 10 millimeters (mm) or 5 mm.

Each set of layers 210, of the one or more sets of layers 210, may include a first layer 215, a second layer 220, and a third layer 225. The second layer 220 may be disposed over (e.g., directly or indirectly on) the first layer 215 and the third layer 225 may be disposed over (e.g., directly or indirectly on) the second layer 220 (e.g., in a stack formation). In some implementations, each set of layers 210 may also include a fourth layer 230, which may be disposed over (e.g., directly or indirectly on) the third layer 225. For example, as shown in FIG. 2A, a first surface (e.g., a bottom surface) of the second layer 220 may be disposed on (e.g., directly on) a surface (e.g., a top surface) of the first layer 215, a first surface (e.g., a bottom surface) of the third layer 225 may be disposed on (e.g., directly on) a second surface (e.g., a top surface) of the second layer 220, and a surface (e.g., a bottom surface) of the fourth layer 230 may be disposed on (e.g., directly on) a second surface (e.g., a top surface) of the third layer 225. In some implementations, one or more other layers may be disposed between the first layer 215 and the second layer 220, may be disposed between the second layer 220 and the third layer 225, and/or may be disposed between the third layer 225 and the fourth layer 230.

In some implementations, the one or more sets of layers 210 may be disposed on a single surface (e.g., the top surface) of the substrate 205 (e.g., as shown in FIG. 2A). Alternatively, when the optical filter 200 includes a plurality of sets of layers 210 (e.g., two or more sets of layers 210), at least one set of layers 210 may be disposed on a first surface (e.g., the top surface) of the substrate 205, and at least one other set of layers 210 may be disposed on a second surface (e.g., a bottom surface) of the substrate 205.

The first layer 215 may comprise a first material that includes at least tantalum and oxygen and/or at least niobium, titanium, and oxygen. For example, the first material may include at least a first oxide, such as at least a tantalum pentoxide ($Ta_2O_5$) material and, in some implementations, one or more other elements or materials (e.g., tantalum, oxygen, hydrogen, silicon, aluminum, nitrogen, a silicon dioxide ($SiO_2$) material, an aluminum oxide ($Al_2O_3$) material, a hafnium oxide ($HfO_2$) material, a silicon nitride ($Si_3N_4$) material, and/or an aluminum nitride (AlN) material). As another example, the first material may include at least a niobium titanium oxide ($NbTiO_x$) material and, in some implementations, one or more other elements or materials (e.g., niobium, titanium, oxygen, a niobium pentoxide ($Nb_2O_5$) material, and/or a niobium tantalum pentoxide ($Nb_{2-x}Ta_xO_5$) material). In some implementations, the first material may include at least one of tantalum and oxygen; niobium, titanium, and oxygen; hydrogen and germanium; silicon and germanium; hydrogen, silicon, and germanium; silicon; or germanium. For example, the first material may include at least one of a tantalum pentoxide ($Ta2O_5$) material, a niobium titanium oxide ($NbTiO_x$) material, a hydrogenated germanium (Ge:H) material, a silicon germanium (SiGe) material, a hydrogenated silicon germanium (SiGe:H) material, a silicon (Si) material, a silicon and hydrogen (SiH) material, a hydrogenated silicon (Si:H) material, or a germanium (Ge) material, and, in some implementations, one or more other elements or materials. Accordingly, the first layer 215 may have a refractive index from 1.9 to 2.5 (e.g., greater than or equal to 1.9 and less than or equal to 2.5) for light associated with a spectral range (e.g., from 400 nm to 700 nm, or another spectral range).

The second layer 220 may comprise a second material that includes at least silicon and oxygen. For example, the second material may include at least a second oxide, such as at least a silicon dioxide ($SiO_2$) material, and/or one or more other elements or materials (e.g., silicon; oxygen; a silicon oxide ($SiO_x$) material, where x is less than 2; a silicon nitride (SiN) material; an aluminum silicon (AlSi) material; and/or another material). In some implementations, the second material may include at least one of silicon and oxygen, aluminum and oxygen, or magnesium and fluorine. For example, the second material may include at least one of a silicon dioxide ($SiO_2$) material, an aluminum oxide ($Al_2O_3$) material, or magnesium fluoride (MgF) material, and, in some implementations, one or more other elements or materials. Accordingly, the second layer 220 may have a refractive index from 1.3 to 1.7 (e.g., greater than or equal to 1.3 and less than or equal to 1.7) for light associated with a spectral range (e.g., from 400 nm to 700 nm, or another spectral range).

The third layer 225 may comprise a third material that includes at least hydrogen and silicon. For example, the third material may comprise at least a silicon and hydrogen (SiH) material and/or a hydrogenated silicon (Si:H) material, and/or one or more other elements or materials (e.g., silicon, hydrogen, a silicon (Si) material, a silicon and hydrogen (SiH) material, a hydrogenated silicon (Si:H) material, a hydrogenated silicon with helium (Si:H—He) material, a hydrogenated silicon with nitrogen (Si:H—N) material, an amorphous silicon (a Si) material, and/or another material). In some implementations, the third material may include hydrogen and germanium; hydrogen and silicon; hydrogen, silicon, and germanium; silicon; or germanium. For example, the third material may include a hydrogenated germanium (Ge:H) material, a silicon germanium (SiGe) material, a hydrogenated silicon germanium (SiGe:H) material, a silicon (Si) material, a silicon and hydrogen (SiH) material, a hydrogenated silicon (Si:H) material, or a germanium (Ge) material, and, in some implementations, one or more other elements or materials. Accordingly, the third layer 225 may have a refractive index from 3.2 to 4.0 (e.g., greater than or equal to 3.2 and less than or equal to 4.0) for light associated with a spectral range (e.g., from 400 nm to 700 nm, or another spectral range).

The fourth layer 230 may comprise a fourth material that includes at least silicon and oxygen. For example, the fourth material may include a silicon dioxide ($SiO_2$) material, and/or one or more other elements or materials (e.g., silicon; oxygen; a silicon oxide ($SiO_x$) material, where x is less than 2; a silicon nitride (SiN) material; an aluminum silicon (AlSi) material; and/or another material). In some implementations, the fourth material may include at least one of silicon and oxygen, aluminum and oxygen, or magnesium and fluorine. For example, the fourth material may include at least one of a silicon dioxide ($SiO_2$) material, an aluminum oxide ($Al_2O_3$) material, or magnesium fluoride (MgF) material, and, in some implementations, one or more other elements or materials. The fourth material may be the same material as the second material (e.g., of the second layer 220), or, alternatively, may be a different material from the second material. In some implementations, the fourth material may be the same as, or similar to, the second material of the second layer 220 (e.g., may comprise at least the second oxide). Accordingly, the fourth layer 230 may have a refractive index from 1.3 to 1.7 (e.g., greater than or equal to 1.3 and less than or equal to 1.7) for light associated with a spectral range (e.g., from 400 nm to 700 nm, or another spectral range).

In some implementations, each layer of a set of layers 210 is associated with a particular thickness. For example, each of the first layer 215, the second layer 220, the third layer 225, and the fourth layer 230 may have a respective thickness in a range from 5 nm to 2000 nm (e.g., a thickness that is greater than or equal to 5 nm and less than or equal to 2000 nm). In some implementations, each of the second layer 220 (e.g., that comprises the second material) and the fourth layer 230 (e.g., that comprises the fourth material) may have a respective thickness in a range from 2 nm to a thickness threshold (e.g., a thickness that is greater than or equal to 2 nm and less than or equal to the thickness threshold). The thickness threshold may be, for example, less than or equal to 4 nm, 6 nm, 8 nm, 10 nm, 15 nm, 20 nm, 30 nm, 40 nm, and/or 50 nm.

In some implementations, when the optical filter 200 includes a plurality of sets of layers 210 (e.g., two or more sets of layers 210), a layer of a first set of layers 210 may have a same or different thickness as a corresponding layer of a second set of layers 210. For example, a first layer 215, a second layer 220, a third layer 225, and fourth layer 230 of the first set of layers may have respective thicknesses that are the same as (e.g., equal to, within a threshold that may be less than or equal to 1 nm) corresponding thicknesses of a first layer 215, a second layer 220, a third layer 225, and a fourth layer 230 of the second set of layers 210. Alternatively, the first layer 215, the second layer 220, the third layer 225, and the fourth layer 230 of the first set of layers may have respective thicknesses that are different than the first layer 215, the second layer 220, the third layer 225, and the fourth layer 230 of the second set of layers 210. Accordingly, each set of layers 210, of the plurality of sets of layers 210, may have a thickness profile that is the same as, or different than, a thickness profile of another set of layers 210 of the plurality of sets of layers 210.

Accordingly, a layer thickness of each layer in a set of layers 210 and/or a quantity of the one or more sets of layers 210 may be selected based on an intended set of optical characteristics of the optical filter 200, such as an intended passband, an intended transmissivity, and/or another optical characteristic. For example, the layer thickness of each layer in a set of layers 210 and/or the quantity of the one or more sets of layers 210 may be selected to permit optical filter 200 to pass a first spectral range (e.g., from 585 nm to 700 nm, or another spectral range) and/or to block a second spectral range (e.g., from 440 nm to 475 nm, or another spectral range).

As shown in FIG. 2B, the optical filter 200 may include the substrate 205, the one or more sets of layers 210 and one or more other sets of layers 235 (e.g., one or more other sets of optical filter layers). The one or more other sets of layers 235 may be disposed over the one or more sets of layers 210 (e.g., on a particular set of layers of the one or more sets of layers 210). For example, as shown in FIG. 2B, the one or more other sets of layers 235 may be disposed on a surface (e.g., a top surface) of a particular set of layers 210 (e.g., a top set of layers 210). Each other set of layers 235, of the one or more other sets of layers 235, may include a fifth layer 240 and a sixth layer 245. As shown in FIG. 2B, the sixth layer 245 may be disposed over (e.g., directly or indirectly on) the fifth layer 240 (e.g., in a stack formation). In some implementations, one or more other layers may be disposed between the fifth layer 240 and the sixth layer 245.

The fifth layer 240 may comprise a fifth material that includes at least tantalum and oxygen and/or at least niobium, titanium, and oxygen. For example, the fifth material may include at least a tantalum pentoxide ($Ta_2O_5$) material and, in some implementations, one or more other elements or materials (e.g., tantalum, oxygen, hydrogen, silicon, aluminum, nitrogen, a silicon dioxide ($SiO_2$) material, and/or an aluminum nitride (AlN) material). As another example, the fifth material may include at least a niobium titanium oxide ($NbTiO_x$) material and, in some implementations, one or more other elements or materials (e.g., niobium, titanium, oxygen, a niobium pentoxide ($Nb_2O_5$) material, and/or a niobium tantalum pentoxide ($Nb_{2-x}Ta_xO_5$) material). In some implementations, the fifth material may include at least one of tantalum and oxygen; niobium, titanium, and oxygen; hydrogen and germanium; silicon and germanium; hydrogen, silicon, and germanium; silicon; or germanium. For example, the first material may include at least one of a tantalum pentoxide ($Ta_2O_5$) material, a niobium titanium oxide ($NbTiO_x$) material, a hydrogenated germanium (Ge:H) material, a silicon germanium (SiGe) material, a hydrogenated silicon germanium (SiGe:H) material, a silicon (Si) material, a silicon and hydrogen (SiH) material, a hydrogenated silicon (Si:H) material, or a germanium (Ge) material, and, in some implementations, one or more other elements or materials. In some implementations, the fifth material may be the same as, or similar to, the first material of the first layer 215 (e.g., may comprise at least the first oxide). Accordingly, the fifth layer 240 may have a refractive index from 1.9 to 2.5 (e.g., greater than or equal to 1.9 and less than or equal to 2.5) for light associated with a spectral range (e.g., from 400 nm to 700 nm, or another spectral range).

The sixth layer 245 may comprise a sixth material that includes at least silicon and oxygen. For example, the sixth material may include a silicon dioxide ($SiO_2$) material and/or one or more other elements or materials (e.g., silicon; oxygen; a silicon oxide ($SiO_x$) material, where x is less than 2; a silicon nitride (SiN) material; an aluminum silicon (AlSi) material; and/or another material). In some implementations, the sixth material may include at least one of silicon and oxygen, aluminum and oxygen, or magnesium and fluorine. For example, the sixth material may include at least one of a silicon dioxide ($SiO_2$) material, an aluminum oxide ($Al_2O_3$) material, or magnesium fluoride (MgF) material, and, in some implementations, one or more other elements or materials. In some implementations, the sixth material may be the same As shown or similar to, the second material of the second layer 220 (e.g., may comprise at least the second oxide). Accordingly, the sixth layer 245 may have a refractive index from 1.3 to 1.7 (e.g., greater than or equal to 1.3 and less than or equal to 1.7) for light associated with a spectral range (e.g., from 400 nm to 700 nm, or another spectral range).

Accordingly, the other set of layers 235 may not include a layer that comprises at least hydrogen and silicon; hydrogen and germanium; hydrogen, silicon, and germanium; silicon; or germanium. As an example, the other set of layers 235 may not include a layer that includes the third material (e.g., may not include the third layer 225).

In some implementations, each layer of the other set of layers 235 is associated with a particular thickness (e.g., in a similar manner as that disclosed herein with respect to each layer of the set of layers 210). For example, each of the fifth layer 240 and the sixth layer 245 may have a respective thickness in a range from 5 nm to 2000 nm (e.g., a thickness that is greater than or equal to 5 nm and less than or equal to 2000 nm). In some implementations, the sixth layer 245 (e.g., that comprises the sixth material) may have a thickness in a range from 2 nm to a thickness threshold (e.g., a thickness that is greater than or equal to 2 nm and less than or equal to the thickness threshold). The thickness threshold may be, for example, less than or equal to 4 nm, 6 nm, 8 nm, 10 nm, 15 nm, 20 nm, 30 nm, 40 nm, and/or 50 nm.

Accordingly, a layer thickness of each layer in a set of layers 210 and/or each layer in an other set of layers 235, and/or a quantity of the one or more sets of layers 210 and/or a quantity of one or more other sets of layers 235 may be selected based on an intended set of optical characteristics of the optical filter 200, such as an intended passband, an intended transmissivity, and/or another optical characteristic. For example, the layer thickness of each layer in a set of layers 210 and/or of each layer in an other set of layers 235, and/or the quantity of the one or more sets of layers 210 the quantity of one or more other sets of layers 235 may be selected to permit optical filter 200 to pass a first spectral range (e.g., from 585 nm to 700 nm, or another spectral range) and/or to block a second spectral range (e.g., from 440 nm to 475 nm, or another spectral range).

In some implementations, the optical filter 200 (and/or the one or more sets of layers 210 and/or the one or more other sets of layers 235) may be configured to have a transmittance level that satisfies a transmittance level threshold for light associated with a first spectral range. For example, the optical filter 200 (and/or the one or more sets of layers 210 and/or the one or more other sets of layers 235) may be configured to have a transmittance level that is greater than or equal to a transmittance level threshold for light associated with a spectral range from 585 nm to 700 nm. The transmittance level threshold may be, for example, greater than or equal to 10%, 15%, 20%, 25%, 35%, 50%, 65%, 75%, 85%, and/or 95%. Additionally, or alternatively, the optical filter 200 (and/or the one or more sets of layers 210 and/or the one or more other sets of layers 235) may be configured to have a blocking level that satisfies a blocking level threshold for light associated with a second spectral range. For example, the optical filter 200 (and/or the one or more sets of layers 210 and/or the one or more other sets of layers 235) may be configured to have a blocking level that is greater than or equal to a blocking level threshold for light associated with a spectral range from 440 nm to 475 nm. The blocking threshold may be, for example, greater than or equal to optical density (OD) 1, OD 1.5, OD 2, OD 3, OD4, OD5, and/or OD6.

In some implementations, the third layer 225, in each of the one or more sets of layers 210, may be configured to have a "low" extinction coefficient associated with the first spectral range and a "high" extinction coefficient associated with the second spectral range (e.g., to facilitate the transmittance level of the first spectral range by the optical filter 200 and the blocking level of the second spectral range by the optical filter 200). For example, the third layer 225 may have an extinction coefficient for the second spectral range (e.g., for each wavelength within the second spectral range, or for a particular wavelength within the second spectral range) that is greater than or equal to a threshold multiple of an extinction coefficient of the third layer 225 for the first spectral range (e.g., for each wavelength within the first spectral range, or for a particular wavelength within the first spectral range). The threshold multiple may be, for example, greater than or equal to 3, 4, 5, 6, or another number. For example, the third layer 225 (e.g., that comprises the third material) may have an extinction coefficient at 475 nm (e.g., in a second spectral range from 440 nm to 475 nm) that is greater than or equal to four (4) times an extinction coefficient of the third layer 225 at 600 nm (e.g., in a first spectral range from 585 nm to 700 nm). Additional details are described herein in relation to FIG. 5.

In some implementations, one or more other layers may be included in the optical filter 200, such as one or more protective layers, one or more cap layers (e.g., to provide environmental protection to the one or more sets of layers 210 and the one or more other sets of layers 235), and/or one or more layers to provide one or more other filtering functionalities (e.g., a blocker or an anti-reflection coating, among other examples). For example, in a single surface configuration, an additional layer (e.g., a cap layer), such as a dielectric layer (e.g., that comprises at least an oxide material, such as a silicon dioxide ($SiO_2$) material, a zirconium dioxide ($ZrO_2$) material, and/or an yttrium oxide ($Y_2O_3$) material; a nitride material, such as a silicon nitride ($Si_3N_4$) material, a titanium nitride (TiN) material, and/or a zirconium nitride (ZrN) material; and/or another material that provides environmental protection), may be disposed on a surface (e.g., a top surface) of the one or more sets of layers 210 and the one or more other sets of layers 235.

As indicated above, FIGS. 2A-2B are provided as examples. Other examples may differ from what is described with regard to FIGS. 2A-2B.

FIGS. 3A-3D are diagrams related to an example configuration 300 of the optical filter 200 described herein.

Figure 3A:
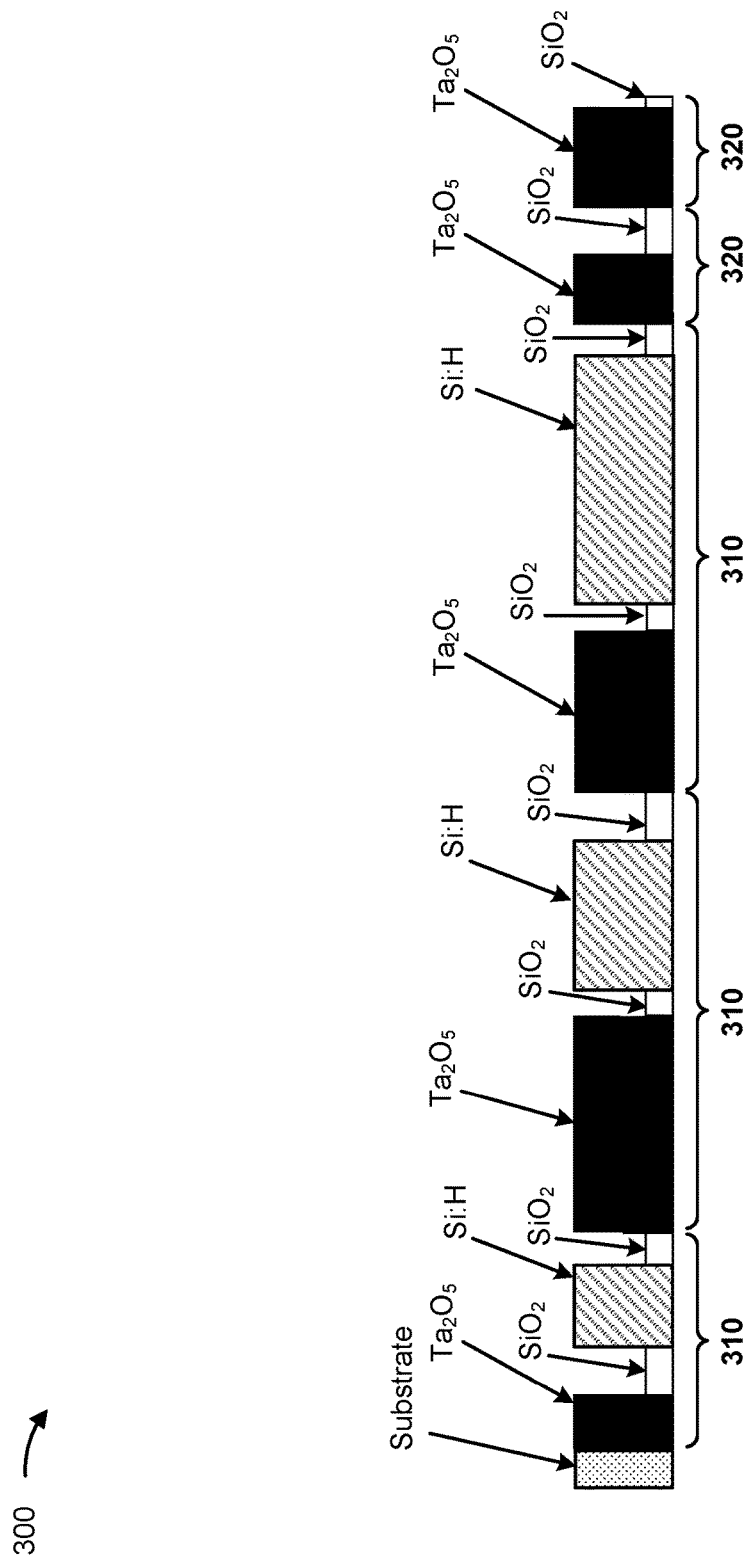

As shown in FIG. 3A, in the example configuration 300, the optical filter 200 may include one or more sets of layers 310 (e.g., that are the same as, or similar to, the one or more sets of layers 210 described herein in relation to FIGS. 2A-2B) and/or one or more sets of layers 320 (e.g., that are the same as, or similar to, the one or more other sets of layers 235 described herein in relation to FIGS. 2A-2B) disposed over a substrate (e.g., that is the same as, or similar to, the substrate 205 described herein in relation to FIGS. 2A-2B). As shown in FIG. 3A, a set of layers 310 includes (e.g., in a stack formation) a first layer that comprises at least a tantalum pentoxide ($Ta_2O_5$) material, a second layer that comprises at least a silicon dioxide ($SiO_2$) material, a third layer that comprises at least a hydrogenated silicon (Si:H) material, and a fourth layer that comprises at least a silicon dioxide ($SiO_2$) material. A set of layers 320 includes a fifth layer that comprises at least a tantalum pentoxide ($Ta_2O_5$) material and a sixth layer that comprises at least a silicon dioxide ($SiO_2$) material.

Figure 3B:
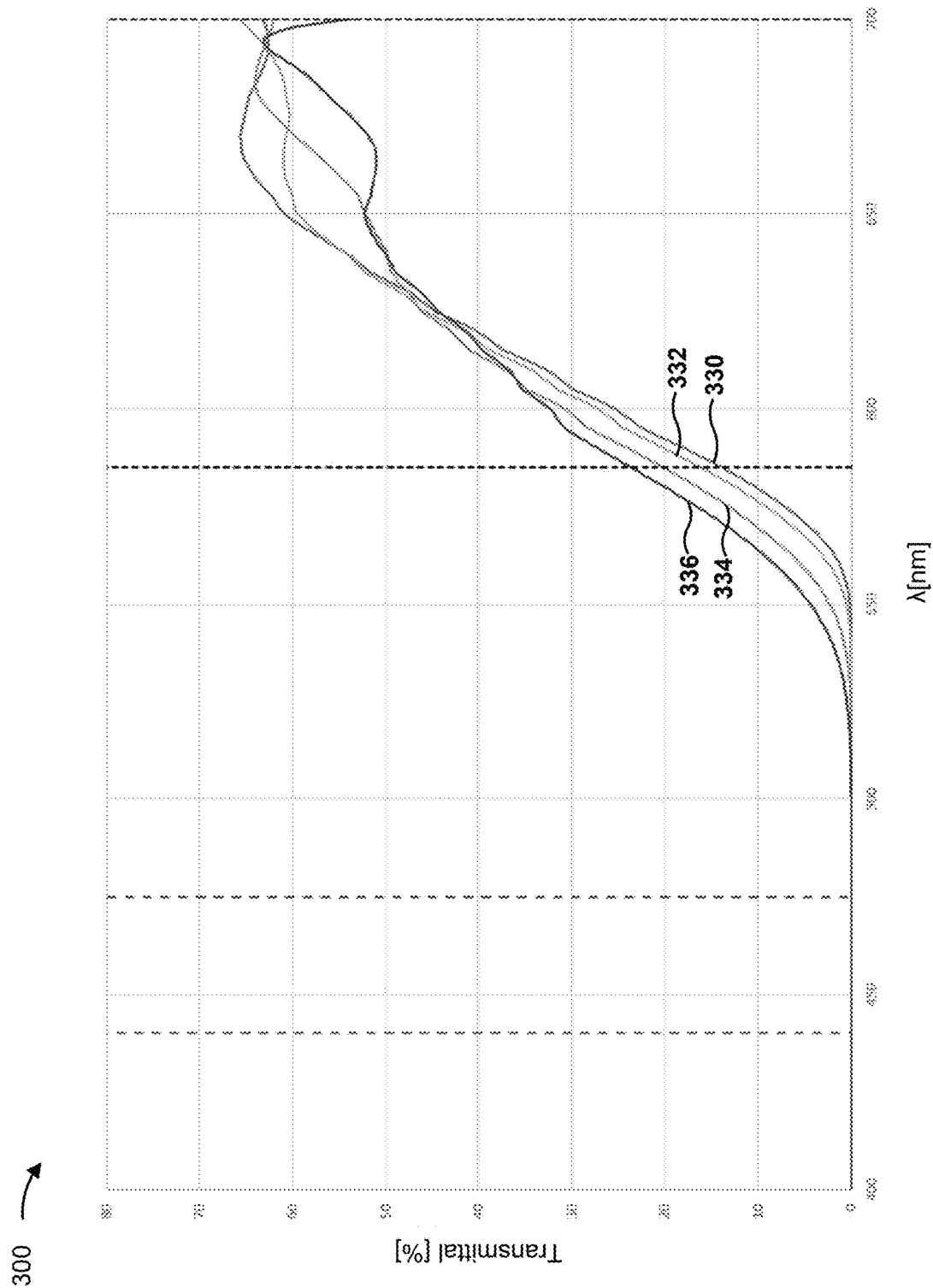

FIG. 3B shows a transmittance performance and angle shift performance of a passband of the example configuration 300 of the optical filter 200. As shown in FIG. 3B, and by curve 330, the optical filter 200 may transmit greater than or equal to 13% (with a peak of 65%) of light associated with a spectral range from 585 nm to 700 nm, when the light has an angle of incidence of 0 degrees. As further shown in FIG. 3B, and by curve 332, the optical filter 200 may transmit greater than or equal to 16% (with a peak of 61%) of light associated with the spectral range from 585 nm to 700 nm, when the light has an angle of incidence of 20 degrees. As shown by curve 334, the optical filter 200 may transmit greater than or equal to 21% (with a peak of 63%) of light associated with the spectral range from 585 nm to 700 nm, when the light has an angle of incidence of 40 degrees. As shown by curve 336, the optical filter 200 may transmit greater than or equal to 25% (with a peak of 62%) of light associated with the spectral range from 585 nm to 700 nm, when the light has an angle of incidence of 60 degrees.

In some implementations, an angle shift at a center wavelength of the passband of optical filter 200 may be less than or equal to 1.0% of the center wavelength for angles of incidence between 0 degrees and 60 degrees. For example, when the optical filter is configured for a center wavelength at 655 nm, the optical filter may have an angle shift of, for example, less than or equal to 6.55 nm at angles of incidence of up to 60 degrees. In some implementations, the optical filter 200 may achieve a transmittance level, at the center wavelength, that is greater than or equal to a transmittance level threshold, such greater than or equal to 10%, 15%, 20%, 25%, 35%, 50%, 65%, 75%, 85%, and/or 95% (e.g., of a peak transmissivity of the optical filter 200 at angles of incidence between 0 to 60 degrees). Moreover, the optical filter may achieve a ripple of less than or equal to +/−10%, less than or equal to +/−5%, or less than or equal to +/−1%, where the ripple represents a deviation in transmittance across the passband at angles of incidence between 0 and 60 degrees.

Figure 3C:
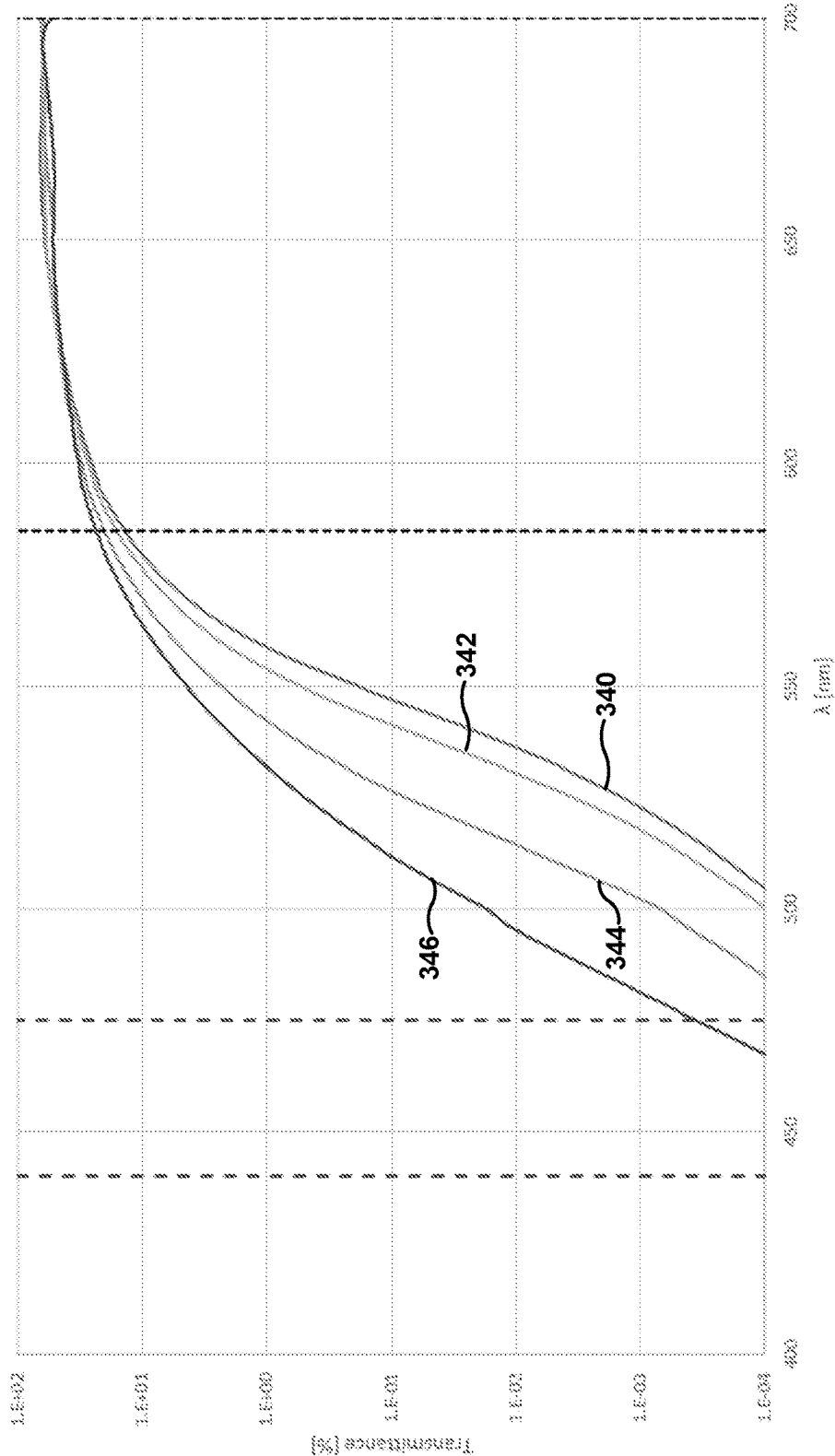

FIG. 3C shows a blocking performance and angle shift performance of a blocking portion of the example configuration 300 of the optical filter 200. As shown in FIG. 3C, the optical filter 200 may block greater than or equal to OD 4 (e.g., transmit less than or equal to 1.E−02%) of light associated with a spectral range from 440 nm to 475 nm, such as when the light has an angle of incidence of 0 degrees (shown by curve 340), an angle of incidence of 20 degrees (shown by curve 342), an angle of incidence of 40 degrees (shown by curve 344), and an angle of incidence of 60 degrees (shown by curve 346).

FIG. 3D shows an example of layer thicknesses of the example configuration 300 of the optical filter 200. As shown in FIG. 3D, the optical filter 200 may comprise a plurality of sets of layers 310 and a plurality of sets of layers 320. As shown in FIG. 3D, the layer thickness of each layer in the sets of plurality of sets of layers 310 and the plurality of sets of layers 320 may have a particular thickness that may, or may not be, the same as another layer.

As indicated above, FIGS. 3A-3D are provided as examples. Other examples may differ from what is described with regard to FIGS. 3A-3D.

FIGS. 4A-4D are diagrams related to an example configuration 400 of the optical filter 200 described herein.

Figure 4A:
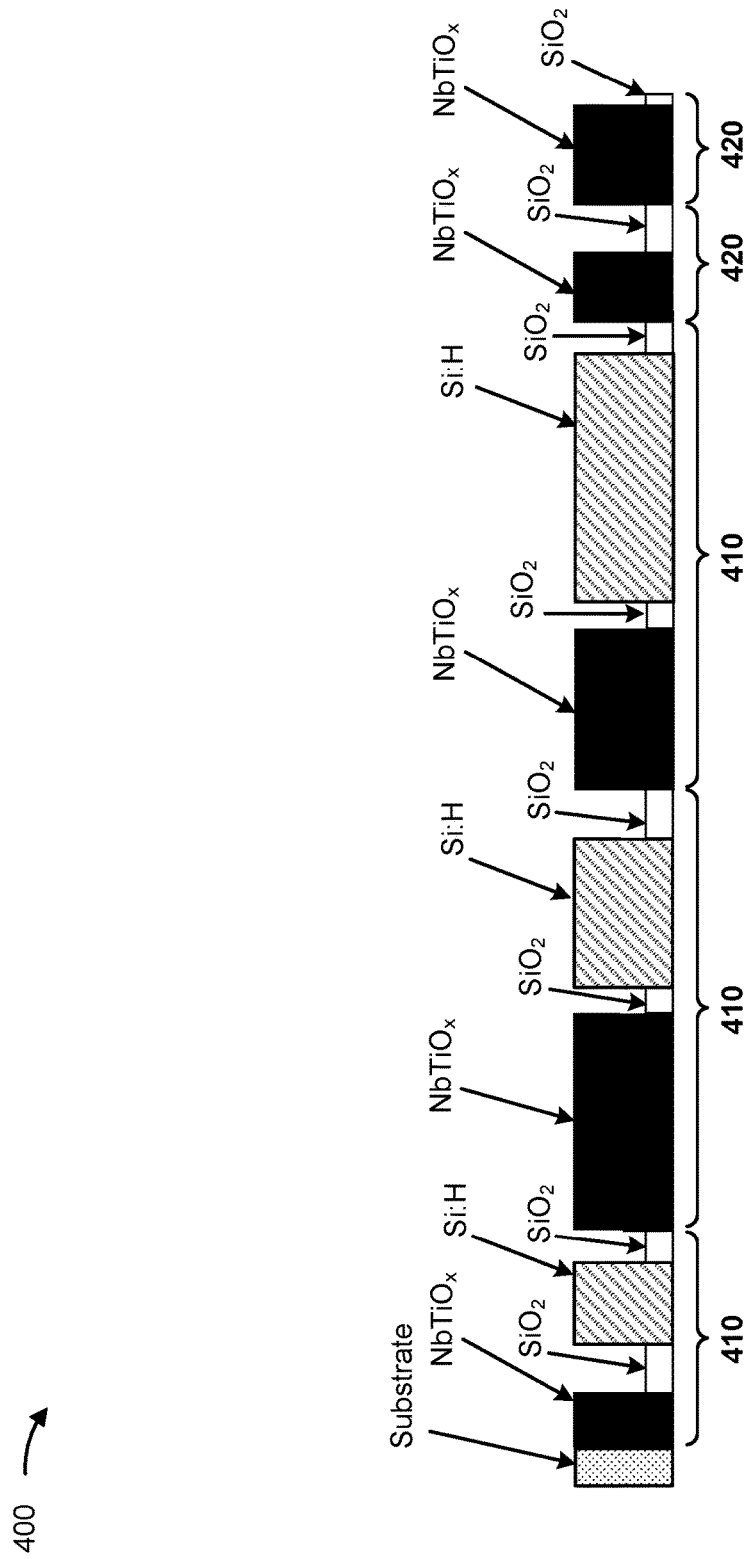

As shown in FIG. 4A, in the example configuration 400, the optical filter 200 may include one or more sets of layers 410 (e.g., that are the same as, or similar to, the one or more sets of layers 210 described herein in relation to FIGS. 2A-2B) and/or one or more sets of layers 420 (e.g., that are the same as, or similar to, the one or more other sets of layers 235 described herein in relation to FIGS. 2A-2B) disposed over a substrate (e.g., that is the same as, or similar to, the substrate 205 described herein in relation to FIGS. 2A-2B). As shown in FIG. 4A, a set of layers 410 includes (e.g., in a stack formation) a first layer that comprises at least a niobium titanium oxide (NbTiO$_x$) material, a second layer that comprises at least a silicon dioxide (SiO$_2$) material, a third layer that comprises at least a hydrogenated silicon (Si:H) material, and a fourth layer that comprises at least a silicon dioxide (SiO$_2$) material. A set of layers 420 includes a fifth layer that comprises at least a niobium titanium oxide (NbTiO$_x$) material and a sixth layer that comprises at least a silicon dioxide (SiO$_2$) material.

Figure 4B:
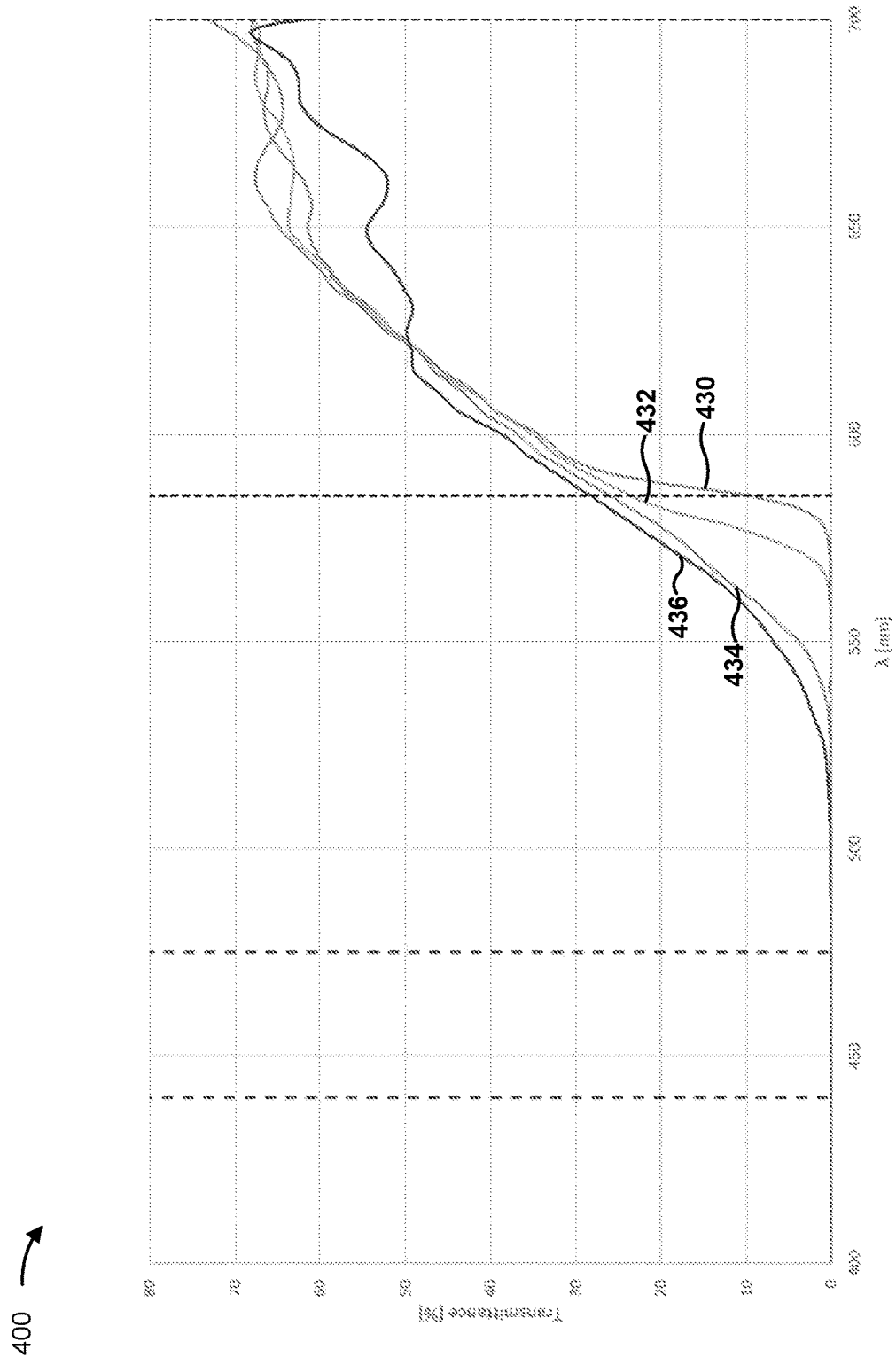

FIG. 4B shows a transmittance performance and angle shift performance of a passband of the example configuration 400 of the optical filter 200. As shown in FIG. 4B, and by curve 430, the optical filter 200 may transmit greater than or equal to 10% (with a peak of 67%) of light associated with a spectral range from 585 nm to 700 nm, when the light has an angle of incidence of 0 degrees. As further shown in FIG. 4B, and by curve 432, the optical filter 200 may transmit greater than or equal to 23% (with a peak of 67%) of light associated with the spectral range from 585 nm to 700 nm, when the light has an angle of incidence of 20 degrees. As shown by curve 434, the optical filter 200 may transmit greater than or equal to 26% (with a peak of 73%) of light associated with the spectral range from 585 nm to 700 nm, when the light has an angle of incidence of 40 degrees. As shown by curve 436, the optical filter 200 may transmit greater than or equal to 28% (with a peak of 68%) of light associated with the spectral range from 585 nm to 700 nm, when the light has an angle of incidence of 60 degrees.

In some implementations, an angle shift at a center wavelength of the passband of optical filter 200 may be less than or equal to 1.0% of the center wavelength for angles of incidence between 0 degrees and 60 degrees. For example, when the optical filter is configured for a center wavelength at 655 nm, the optical filter may have an angle shift of, for example, less than or equal to 6.55 nm at angles of incidence of up to 60 degrees. In some implementations, the optical filter 200 may achieve a transmittance level, at the center wavelength, that is greater than or equal to a transmittance level threshold, such greater than or equal to 10%, 15%, 20%, 25%, 45%, 50%, 65%, 75%, 85%, and/or 95% (e.g., of a peak transmissivity of the optical filter 200 at angles of incidence between 0 to 60 degrees). Moreover, the optical filter may achieve a ripple of less than or equal to +/−10%, less than or equal to +/−5%, or less than or equal to +/−1%, where the ripple represents a deviation in transmittance across the passband at angles of incidence between 0 and 60 degrees.

Figure 4C:
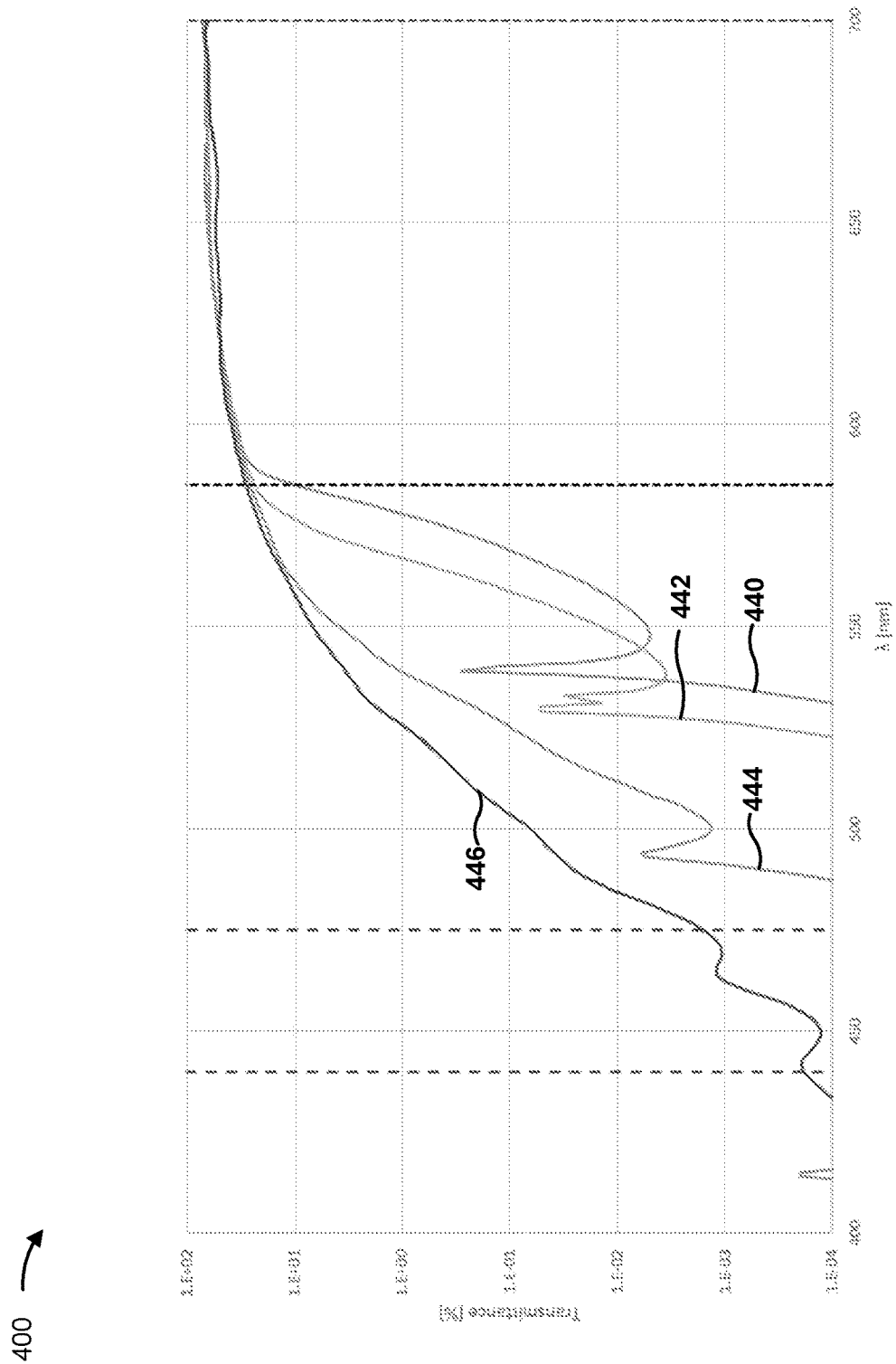

FIG. 4C shows a blocking performance and angle shift performance of a blocking portion of the example configuration 400 of the optical filter 200. As shown in FIG. 4C, the optical filter 200 may block greater than or equal to OD 4 (e.g., transmit less than or equal to 1.E−02%) of light associated with a spectral range from 440 nm to 475 nm, such as when the light has an angle of incidence of 0 degrees (shown by curve 440), an angle of incidence of 20 degrees (shown by curve 442), an angle of incidence of 40 degrees (shown by curve 444), and an angle of incidence of 60 degrees (shown by curve 446).

FIG. 4D shows an example of layer thicknesses of the example configuration 400 of the optical filter 200. As shown in FIG. 4D, the optical filter may comprise a plurality of sets of layers 410 and a plurality of sets of layers 420. As shown in FIG. 4D, the layer thickness of each layer in the sets of plurality of sets of layers 410 and the plurality of sets of layers 420 may have a particular thickness that may, or may not be, the same as another layer.

As indicated above, FIGS. 4A-4D are provided as examples. Other examples may differ from what is described with regard to FIGS. 4A-4D.

Figure 5:
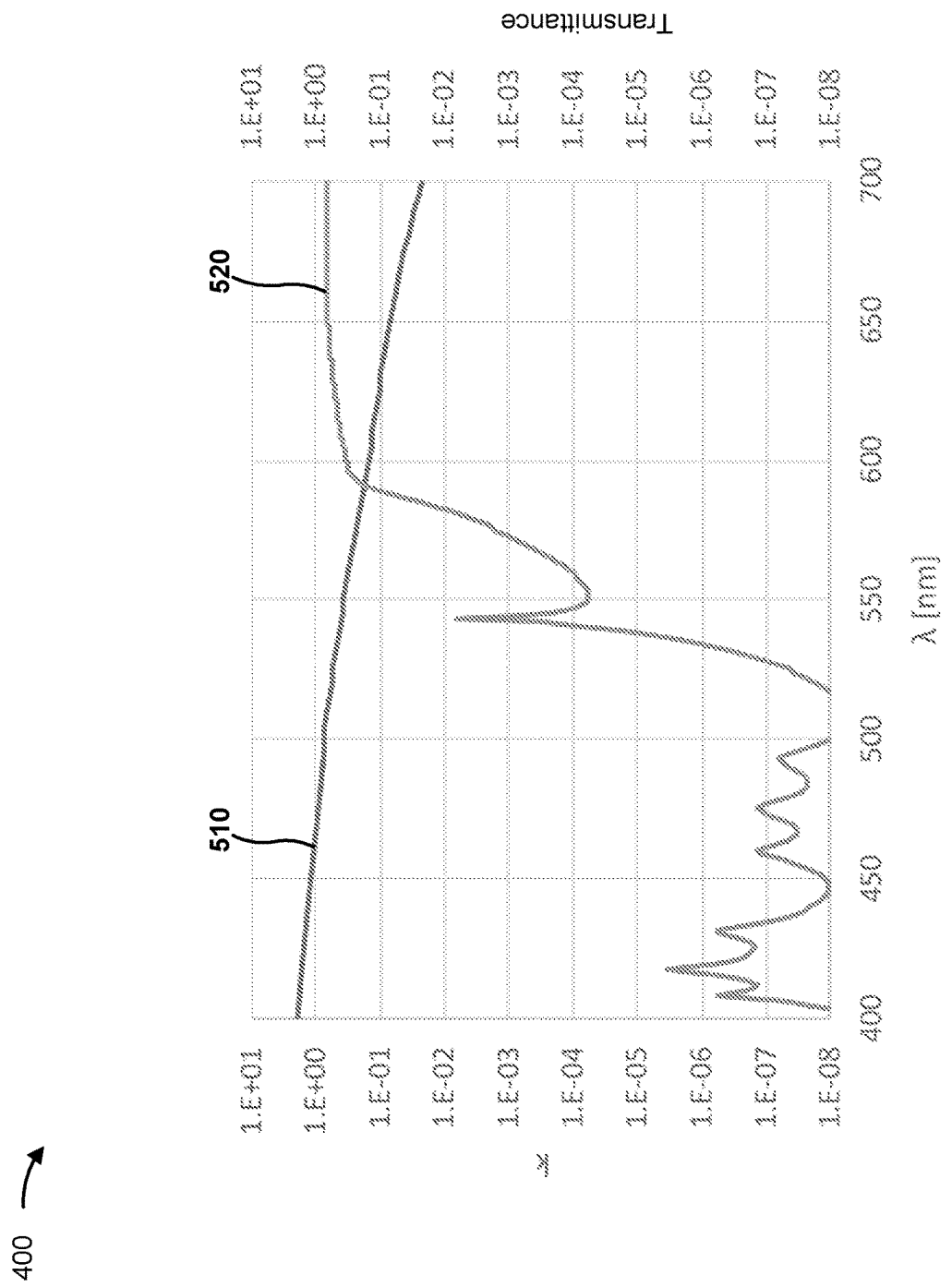
FIG. 5 shows an example extinction coefficient (k) performance for a layer of the optical filter and an example transmittance performance of the optical filter.

FIG. 5 shows an example extinction coefficient (k) performance for a third layer 225 of the optical filter 200 and an example transmittance performance of the optical filter 200. As shown in FIG. 5, and by curve 510, the third layer 225 may be configured to have an extinction coefficient that decreases as light wavelength increases. In this way, the third layer 225 may be configured to have a low extinction coefficient associated with a first spectral range (e.g., from 585 nm to 700 nm) and a high extinction coefficient associated with a second spectral range (e.g., from 440 nm to 475 nm). For example, the third layer 225 may have an extinction coefficient for the second spectral range (e.g., for each wavelength within the second spectral range, or for a particular wavelength within the second spectral range) that is greater than or equal to a threshold multiple of an extinction coefficient of the third layer 225 for the first spectral range (e.g., for each wavelength within the first spectral range, or for a particular wavelength within the first spectral range). The threshold multiple may be, for example, greater than or equal to 3, 4, 5, 6, or another number.

As an example, as shown in FIG. 5, the third layer 225 may have a first extinction coefficient that is greater than or equal to 0.8 at 475 nm (e.g., that is within the second spectral range) and a second extinction coefficient that is less than or equal to 0.2 at 600 nm (e.g., that is within thin the first spectral range), and therefore the first extinction coefficient is greater than or equal to at least four (5) times the second extinction coefficient. As another example, as further shown in FIG. 5, the third layer 225 may have a first extinction coefficient that is greater than or equal to 0.8 for the second spectral range (e.g., for each wavelength from 440 nm to 475 nm). The first extinction coefficient may be, for example, greater than or equal to 0.8 and less than or equal to 1.3 for the second spectral range. A second extinction coefficient that is less than or equal to 0.2 for the first spectral range (e.g., for each wavelength from 585 nm to 700 nm). The second extinction coefficient may be, for example, greater than or equal to 0.02 and less than or equal to 0.2 for the first spectral range. Therefore the first extinction coefficient is greater than or equal to at least four (4) times the second extinction coefficient.

In this way, the third layer 225 facilitates transmission of light associated with the first spectral range and blocking of light associated with the second spectral range. Accordingly, as shown in FIG. 5 and by curve 520, the optical filter 200 may transmit greater than or equal to 10% (with a peak of 67%) of light associated with a spectral range from 585 nm to 700 nm, when the light has an angle of incidence of 0 degrees. Further the optical filter 200 may block greater than or equal to OD 4 (e.g., transmit less than or equal to 1.E−02%) of light associated with a spectral range from 440 nm to 475 nm, when the light has an angle of incidence of 0 degrees.

As indicated above, FIG. 5 is provided as an example. Other examples may differ from what is described with regard to FIG. 5.

Figure 6:
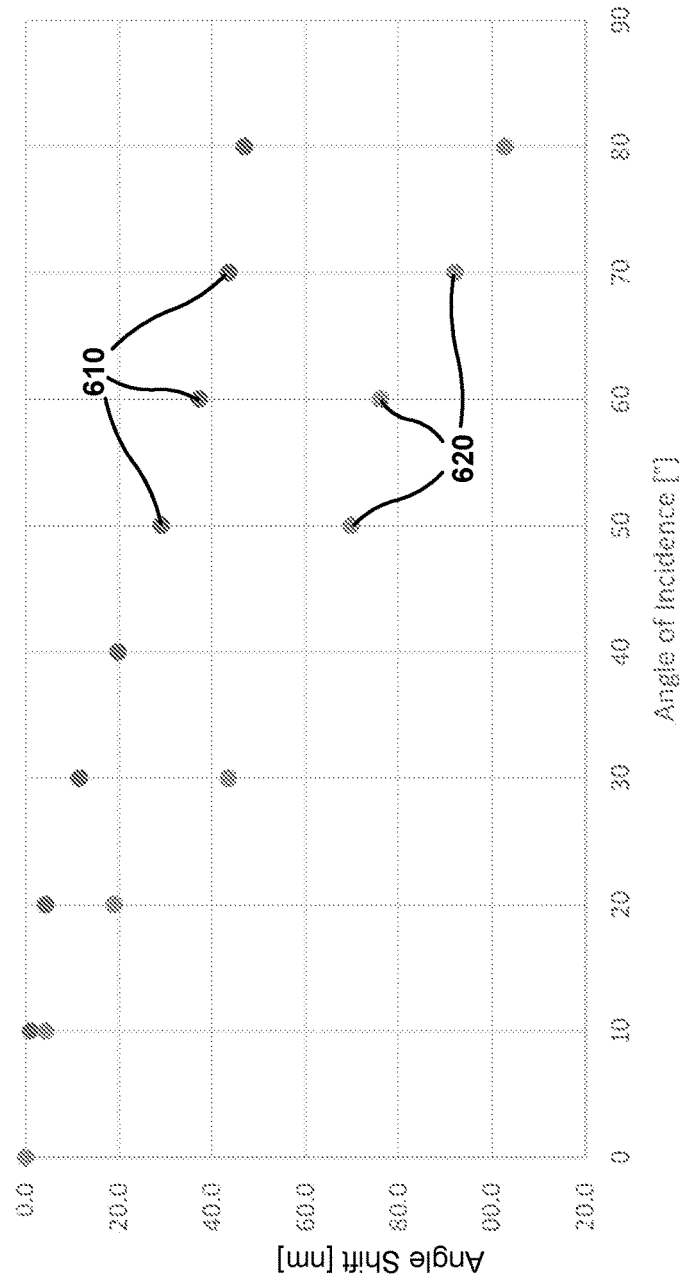
FIG. 6 shows an example angle shift performance of the optical filter.

FIG. 6 shows an example angle shift performance of the optical filter 200 at an OD 4 cut-on wavelength (e.g., 535 nm) ("the wavelength"). As shown by dots 610, for different angle of incidences, the optical filter 200 may have a smaller angle shift associated with transmitting and/or blocking light associated with the wavelength than that of a multi-component interference optical filter (e.g., indicated by dots 620). As shown in FIG. 6, the optical filter 200 reduces angle shift for the wavelength by at least 30% to 50%, from angles of incidence 10 degrees to 80 degrees, as compared to a multi-component interference optical filter. The optical filter 200 may therefore be termed a "low angle shift" optical filter. In this way, the optical filter 200 reduces an amount of unwanted or undesired light that is transmitted by the optical filter 200, which improves a sensing accuracy of an optical sensor that receives light that is passed by the optical filter 200.

As indicated above, FIG. 6 is provided as an example. Other examples may differ from what is described with regard to FIG. 6.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "bottom," "above,"

"upper," "top," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

As used herein, the term "X material," where X is a chemical composition, such as $Ta_2O_5$, $SiO_2$, or Si:H, indicates that at least a threshold percentage of X is included in the X material. The threshold percentage may be, for example, greater than or equal to 1%, 5%, 10%, 25%, 50%, 75%, 85%, 90%, 95%, and/or 99%. Also, when a material is referred to by a specific chemical name or formula, the material may include non-stoichiometric variations of the stoichiometrically exact formula identified by the chemical name. For example, the aluminum nitride (AlN) material described herein may include AlNx, where x is in a range from 0.8 to 1.2.

What is claimed is:

1. An optical interference filter, comprising:
   a substrate; and
   a plurality of sets of layers that are disposed over the substrate,
      wherein a first set of layers, of the plurality of sets of layers, includes:
         a first layer that comprises at least tantalum and oxygen or at least niobium, titanium, and oxygen;
         a second layer, disposed over the first layer, that comprises at least silicon and oxygen;
         a third layer, disposed over the second layer, that comprises at least hydrogen and silicon; and
         a fourth layer, disposed over the third layer, that comprises at least silicon and oxygen, wherein:
            the optical interference filter is configured to transmit light associated with a first spectral range and to block light associated with a second spectral range,
            the third layer has an extinction coefficient for the second spectral range that is greater than four times an extinction coefficient of the third layer for the first spectral range, and
            the first layer is disposed directly on the substrate.

2. The optical interference filter of claim 1, wherein:
   the first layer comprises at least a tantalum pentoxide ($Ta_2O_5$) material or at least a niobium titanium oxide ($NbTiO_x$) material;
   the second layer comprises at least a silicon dioxide ($SiO_2$) material;
   the third layer comprises at least a hydrogenated silicon (Si:H) material; and
   the fourth layer comprises at least another $SiO_2$ material.

3. The optical interference filter of claim 1, wherein:
   the first spectral range is from 585 nanometers to 700 nanometers;
   the second spectral range is from 440 nanometers to 475 nanometers;
   the third layer comprises at least a hydrogenated silicon (Si:H) material;
   the third layer has a first extinction coefficient that is greater than 0.8 at 475 nanometers; and
   the third layer has a second extinction coefficient that is less than or equal to 0.2 at 600 nanometers.

4. The optical interference filter of claim 1, wherein at least one of:
   a first surface of the second layer is disposed on a surface of the first layer,
   a first surface of the third layer is disposed on a second surface of the second layer, or
   a surface of the fourth layer is disposed on a second surface of the third layer.

5. The optical interference filter of claim 1, wherein the first spectral range is from 585 nanometers to 700 nanometers,
   wherein the optical interference filter is configured to have a transmittance level that is greater than or equal to a transmittance level threshold for light associated with the first spectral range,
   wherein the transmittance level threshold is 10%.

6. The optical interference filter of claim 1, wherein the second spectral range is from 440 nanometers to 475 nanometers,
   wherein the optical interference filter is configured to have a blocking level that is greater than or equal to a blocking level threshold for light associated with the second spectral range,
   wherein the blocking level threshold is optical density (OD) 4.

7. The optical interference filter of claim 1, further comprising one or more other sets of layers that are disposed over the plurality of sets of layers, wherein each other set of layers, of the one or more other sets of layers, includes:
   a fifth layer that comprises at least tantalum and oxygen or at least niobium, titanium, and oxygen; and
   a sixth layer that comprises at least silicon and oxygen,
      wherein each other set of layers does not include a layer that comprises at least hydrogen and silicon.

8. An optical interference filter, comprising:
   a substrate; and
   a plurality of sets of layers that are disposed over the substrate,
      wherein a first set of layers, of the plurality of sets of layers, includes:
         a first layer that comprises at least a tantalum pentoxide ($Ta_2O_5$) material or a niobium titanium oxide ($NbTiO_x$) material;
         a second layer, disposed over the first layer, that comprises at least an oxide; and
         a third layer, disposed over the second layer, that comprises at least hydrogen and silicon, wherein:
            the optical interference filter is configured to transmit light associated with a first spectral range and to block light associated with a second spectral range,
            the third layer has an extinction coefficient for the second spectral range that is greater than four times an extinction coefficient of the third layer for the first spectral range, and
            the first layer is disposed directly on the substrate.

9. The optical interference filter of claim 8, wherein:
   the second layer comprises at least a silicon dioxide ($SiO_2$) material; and
   the third layer comprises at least a hydrogenated silicon (Si:H) material.

10. The optical interference filter of claim 8, wherein:
    the first spectral range is from 585 nanometers to 700 nanometers;
    the second spectral range is from 440 nanometers to 475 nanometers;

the third layer has an extinction coefficient that is greater than 0.8 for the second spectral range; and the third layer has an extinction coefficient that is less than or equal to 0.2 for the first spectral range.

11. The optical interference filter of claim 8, wherein each set of layers, of the plurality of sets of layers, includes:
a respective first layer that comprises at least the $Ta_2O_5$ material or the $NbTiO_x$ material,
a respective second layer, disposed over the respective first layer, that comprises at least the oxide,
a respective third layer, disposed over the respective second layer, that comprises at least hydrogen and silicon, and
a respective fourth layer, disposed over the respective third layer, that comprises at least the oxide.

12. The optical interference filter of claim 8, wherein the first spectral range is from 585 nanometers to 700 nanometers,
wherein the optical interference filter is configured to have a transmittance level that is greater than or equal to a transmittance level threshold for light associated with the first spectral range,
wherein the transmittance level threshold is 10%.

13. The optical interference filter of claim 8, wherein the second spectral range is from 440 nanometers to 475 nanometers,
wherein the optical interference filter is configured to have a blocking level that is greater than or equal to a blocking level threshold for light associated with the second spectral range,
wherein the blocking level threshold is optical density (OD) 4.

14. The optical interference filter of claim 8, further comprising one or more other sets of layers that are disposed over the plurality of sets of layers, wherein each other set of layers, of the one or more other sets of layers, includes:
a fifth layer that comprises at least the $Ta_2O_5$ material or the $NbTiO_x$ material; and
a sixth layer that comprises at least the oxide,
wherein each other set of layers does not include a layer that comprises at least hydrogen and silicon.

15. An optical interference filter, comprising:
a substrate; and
a plurality of sets of layers that are disposed over the substrate,
wherein a first set of layers, of the plurality of sets of layers, includes:
a first layer that comprises at least a first oxide including at least one of tantalum or niobium;
a second layer, disposed over the first layer, that comprises at least a second oxide; and
a third layer disposed over the second layer, wherein:
the optical interference filter is configured to transmit light associated with a first spectral range and to block light associated with a second spectral range,
the third layer has an extinction coefficient for the second spectral range that is greater than four times an extinction coefficient of the third layer for the first spectral range, and
the first layer is disposed directly on the substrate.

16. The optical interference filter of claim 15, wherein:
the first layer comprises at least one of:
tantalum and oxygen,
niobium, titanium, and oxygen,
hydrogen and germanium,
hydrogen and silicon,
hydrogen, silicon, and germanium,
silicon, or
germanium;
the second layer comprises at least one of:
silicon and oxygen,
aluminum and oxygen, or
magnesium and fluorine; and
the third layer comprises at least one of:
hydrogen and germanium,
hydrogen and silicon,
hydrogen, silicon, and germanium,
silicon, or
germanium.

17. The optical interference filter of claim 15, wherein each set of layers, of the plurality of sets of layers, includes:
a respective first layer that comprises at least the first oxide,
a respective second layer, disposed over the respective first layer, that comprises at least the second oxide,
a respective third layer disposed over the respective second layer, and
a respective fourth layer, disposed over the respective third layer, that comprises at least the second oxide.

18. The optical interference filter of claim 15, wherein at least one of:
the first spectral range is from 585 nanometers to 700 nanometers; or
the second spectral range is from 440 nanometers to 475 nanometers.

19. The optical interference filter of claim 15, wherein the optical interference filter is configured to have a transmittance level that is greater than or equal to a transmittance level threshold for light associated with the first spectral range,
wherein the transmittance level threshold is 10%.

20. The optical interference filter of claim 15, wherein the optical interference filter is configured to have a blocking level that is greater than or equal to a blocking level threshold for light associated with the second spectral range,
wherein the blocking level threshold is optical density (OD) 4.

* * * * *